United States Patent
Bischoff

(10) Patent No.: US 11,724,437 B2
(45) Date of Patent: Aug. 15, 2023

(54) BENDING METHOD FOR BENDING A COMPOSITE BAR

(71) Applicant: Solidian GmbH, Albstadt (DE)

(72) Inventor: Thomas Bischoff, Bisingen (DE)

(73) Assignee: SOLIDIAN GMBH, Albstadt (DE)

( * ) Notice: Subject to any disclaimer, the term of this patent is extended or adjusted under 35 U.S.C. 154(b) by 453 days.

(21) Appl. No.: 16/643,416

(22) PCT Filed: Aug. 24, 2018

(86) PCT No.: PCT/EP2018/072907
§ 371 (c)(1),
(2) Date: Feb. 28, 2020

(87) PCT Pub. No.: WO2019/042895
PCT Pub. Date: Mar. 7, 2019

(65) Prior Publication Data
US 2020/0189174 A1    Jun. 18, 2020

(30) Foreign Application Priority Data
Sep. 1, 2017 (DE) ...................... 10 2017 120 143.2

(51) Int. Cl.
*B29C 53/84* (2006.01)
*B29C 53/08* (2006.01)
(Continued)

(52) U.S. Cl.
CPC ............ *B29C 53/84* (2013.01); *B29C 53/083* (2013.01); *B29C 53/086* (2013.01); *B29C 70/52* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,890,108 A | 6/1975 | Welsh | |
| 5,422,048 A * | 6/1995 | Kodama | B29C 35/08 |
| | | | 264/173.17 |

(Continued)

FOREIGN PATENT DOCUMENTS

| | | |
|---|---|---|
| DE | 1838904 U | 10/1961 |
| DE | 10222256 B4 | 3/2004 |

(Continued)

OTHER PUBLICATIONS

German Office Action dated Nov. 30, 2021, in corresponding German Application No. 102017120143.2, with machine English translation (15 pages).

(Continued)

*Primary Examiner* — Francisco W Tschen
*Assistant Examiner* — Elisa H Vera
(74) *Attorney, Agent, or Firm* — Fitch, Even, Tabin & Flannery LLP

(57) ABSTRACT

A bending method and a bending device, wherein a composite bar comprising a bundle of reinforcing fibres embedded in a polymer matrix is bent at a bending point. To make it bendable, the composite bar is heated locally at the bending point using an ultrasonic device with a sonotrode. After the bending point has been heated, an infeeding movement between the composite bar and the sonotrode is used to deform a region of the composite bar at the bending point to create a deformed portion of which the outer dimensions are different from the outer dimensions of the bar portions of the composite bar adjoining the bending point. The two bar portions are then moved or angled away in relation to one another, and so the composite bar is curved at the bending point. Once the desired bending has been achieved, the composite bar is cured at the bending point.

18 Claims, 7 Drawing Sheets

(51) Int. Cl.
  *B29C 70/52* (2006.01)
  *B29K 105/10* (2006.01)
  *B29L 31/00* (2006.01)
  *B29L 31/10* (2006.01)

(52) U.S. Cl.
  CPC ... *B29K 2105/106* (2013.01); *B29L 2031/001* (2013.01); *B29L 2031/10* (2013.01)

(56) References Cited

U.S. PATENT DOCUMENTS

| | | |
|---|---|---|
| 5,456,591 A | 10/1995 | Lo |
| 6,290,635 B1 | 9/2001 | Demmel et al. |
| 6,519,500 B1 | 2/2003 | White |
| 7,568,608 B1* | 8/2009 | Ding ............... B23K 20/1245 228/2.1 |
| 8,916,635 B2 | 12/2014 | Schmidt et al. |
| 2002/0130438 A1 | 9/2002 | Jambor et al. |
| 2007/0285337 A1* | 12/2007 | Maddock ............... G03B 21/58 345/1.1 |
| 2008/0141614 A1* | 6/2008 | Knouff ................ B29C 53/14 52/309.1 |
| 2014/0095096 A1* | 4/2014 | Na ....................... G01N 25/72 374/45 |
| 2014/0323001 A1 | 10/2014 | Schmidt et al. |
| 2017/0008998 A1* | 1/2017 | Sodano ............ C08G 18/3846 |
| 2017/0066209 A1 | 3/2017 | Hyson |
| 2018/0178440 A1 | 6/2018 | Gómez Casanova |
| 2019/0085563 A1* | 3/2019 | Bischoff ................. E04C 5/07 |

FOREIGN PATENT DOCUMENTS

| | | |
|---|---|---|
| DE | 102010001987 A1 | 8/2011 |
| DE | 102012005973 A1 | 11/2012 |
| DE | 102014116818 A1 | 5/2016 |
| DE | 102014116819 A1 | 5/2016 |
| EP | 2399717 A2 | 12/2011 |
| EP | 3095589 A1 | 11/2016 |
| JP | S61195825 A | 8/1986 |
| JP | H09155988 A | 6/1997 |
| SU | 311764 A1 | 8/1971 |
| SU | 1435477 A1 | 11/1988 |
| WO | 98/17573 A1 | 4/1998 |
| WO | 2007/118643 A1 | 10/2007 |
| WO | 2013/006964 A1 | 1/2013 |
| WO | 2016/166399 A1 | 10/2016 |

OTHER PUBLICATIONS

Russian Office Action and Search Report dated Nov. 18, 2021, in corresponding Russian Application No. 2020112266/05(020728), with machine English translation (18 pages).
German Office Action dated Jun. 18, 2018, in corresponding German Application No. 10 2017 120 143.2, with machine English translation (13 pages).
International Search Report and Written Opinion dated Nov. 2, 2018, in corresponding International Application No. PCT/EP2018/072907, with machine English translation (19 pages).
Rizzolo, Robert H., "Ultrasonic consolidation of thermoplastic composite prepreg for automated fiber placement", Journal of Thermalplastic Composite Materials, 2015, pp. 1480-1497, vol. 29, Issue 11, SAGE (18 pages).

* cited by examiner

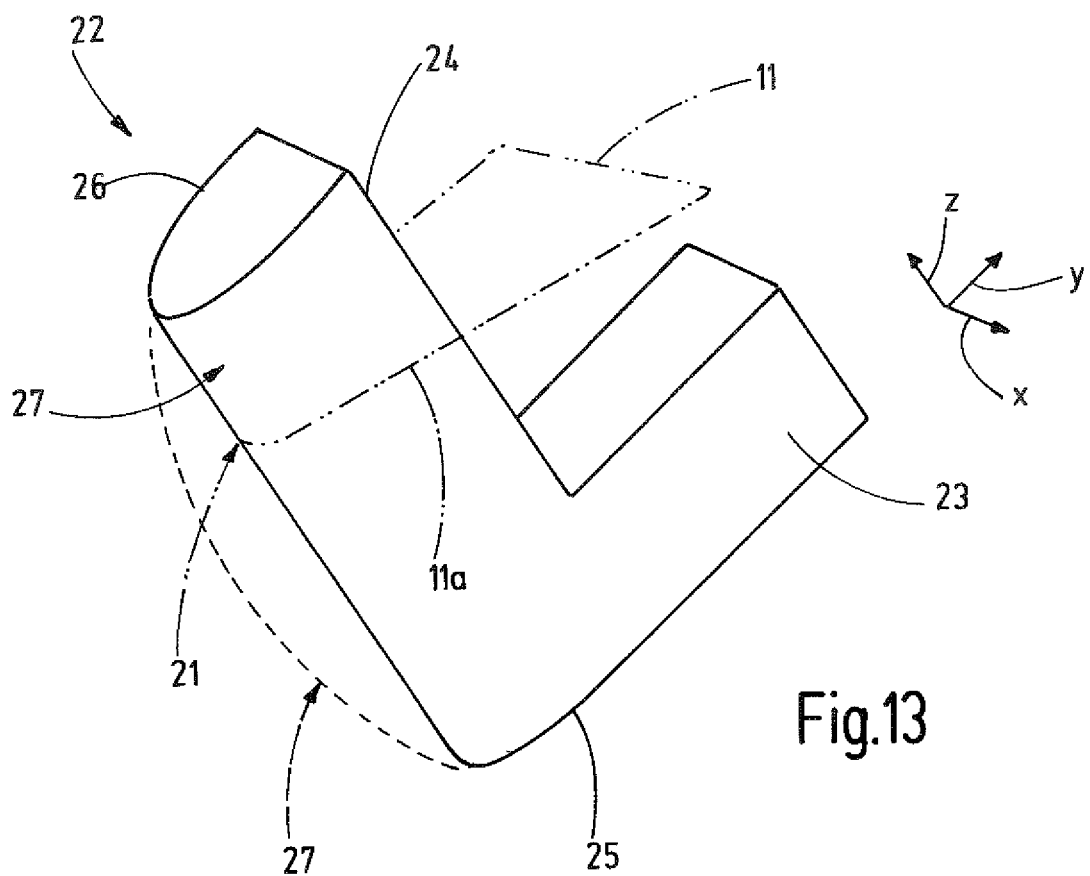
Fig.13
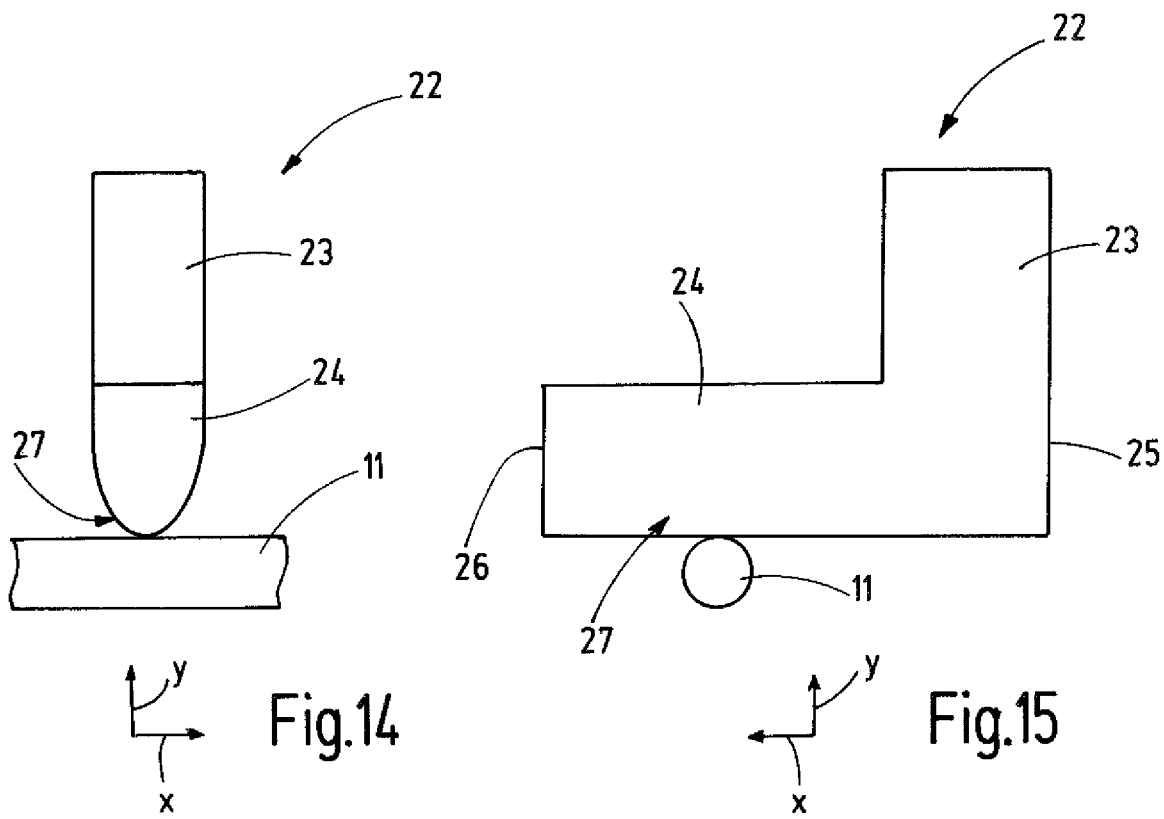
Fig.14
Fig.15

BENDING METHOD FOR BENDING A COMPOSITE BAR

CROSS REFERENCE TO RELATED APPLICATIONS

This patent application is the national phase of PCT/EP2018/072907, filed Aug. 24, 2018, which claims the benefit of German Patent Application No. 10 2017 120 143.2, filed Sep. 1, 2017.

TECHNICAL FIELD

The invention refers to a bending method as well as a bending device for bending at least composite bar at a bending location. It is possible to bend multiple composite bars concurrently that are, for example, part of a mesh body. Such a mesh body comprises meshes that are limited by multiple composite bars. The plastic matrix of the mesh body or the composite bars can be formed integrally such that a uniform mesh body is created. Alternatively the bars can be connected with each other at intersection locations in multiple layers and form the mesh body.

BACKGROUND

Such composite bars can be used in many technical fields for construction of articles, in which composite materials are used, as e.g. in the vehicle construction (bicycles, boats, airplanes, cars, etc.).

Bars are also used as reinforcement bars in the field of construction in order to reinforce construction material bodies, like concrete components or cement components. Frequently reinforcement bars made of steel are used that can be adapted to the geometric requirements of the construction material body to be produced by means of usual bending methods and bending devices in a simple manner.

On the other hand, reinforcement bars of composite material are also known, in which a reinforcement fiber bundle (so-called roving) is embedded in a plastic matrix. In such reinforcement bars different approaches have been followed in order to adapt the extension of the composite bar to the required geometry. For example, the plastic matrix may not be cured completely during the manufacturing of the composite bar in order to bring it into the desired shape before the complete curing. However, this requires a complex storage of the not cured composite bar that usually requires cooling in order to avoid the complete curing. This approach is used with a thermoset plastic matrix. In case of a thermoplastic plastic matrix, a deformation can also be carried out after curing. For this the thermoplastic plastic matrix is heated until the deformability is achieved in order to deform the composite bar and to cure it again subsequently.

A fiber-reinforced composite bar is known from US 2008/0141614 A1. The plastic matrix is thermoplastic and can thus be heated for bending or deformation of the composite bar and can subsequently be cured again by cooling.

U.S. Pat. No. 5,456,591 A describes a method for manufacturing a tennis racket, in which composite material is heated and lead around a die. Subsequently, the composite material is cooled, whereby the tennis racket frame obtains its desired shape. A similar method is known from WO 2007/118643 A1.

In the method known from WO 2013/006964 A1 the composite material is first bent into the desired shape and subsequently cured by means of a binder.

For heating the thermoplastic plastic matrix different methods are in use. For example, in a circulating air oven or by contact heating via heatable tools, heating can be carried out. This however requires that the heat conduction within the component is sufficiently high. The method is time and energy consuming.

The plastic matrix can also be subject to heat radiation (infrared radiation) or electron beam radiation. For example, DE 102 22 256 B4 describes the heating of a plastic tube by infrared radiation before the bending. However, in doing so, the depths of penetration are small and depending on the diameter of the composite bar, such a heating is not suitable or very time consuming. The electron beam radiation further comprises the danger that the electrons damage the polymer of the thermoplastic plastic matrix. In addition, the working environment must be protected in a complex manner for reasons of the occupational safety.

It is also known to heat a thermoplastic plastic matrix with high frequency stimulation via electrodes. A method for heating of dielectric hollow bodies by means of radio frequency is known from DE 10 2014 116 819 A1. In a specific embodiment of this method or this device a plasma may be ignited in the inside of a hollow body and may be used as plasma electrode (DE 10 2014 116 818 A1). For this, groups that can be stimulated must be contained in the material to be heated, which limits the material selection remarkably. In addition, the shape of the electrodes must be adapted to the geometry of the component to be heated, which in turn leads to an additional effort, if different shaped reinforcing components shall be heated and deformed.

Finally also the use of microwave technology for heating did not spread, because the microwave technology limits the usable materials. In glass-fiber reinforced reinforcement components only marginal heating is carried out. In addition, a homogenous microwave emission must be achieved, which can be obtained usually only in closed ovens.

EP 2 399 717 A2 describes a device and a method for capacitive heating of a tube or a tube section and for subsequent bending or deforming of the tube by applying a radio frequency voltage between two electrodes.

U.S. Pat. No. 3,890,108 A describes the configuration of a corner region of a sandwich component. At the bend inner side of the sandwich a cavity is formed.

EP 309 55 89 A1 refers to a method for connecting two parts by ultrasonic welding.

U.S. Pat. No. 6,519,500 B1 describes an additive manufacturing method, in which layers that are placed onto each other, are pressed with pressure against each other and are connected with each other by insertion of ultrasonic oscillations. Such a method is also known from the article "*Ultrasonic consolidation of thermoplastic composite prepreg for automated fiber placement*" Robert H. Rizzolo and Daniel F. Walczyk, Journal of Thermalplastic Composite Materials 1-18, 2015, DOI: 10.1177/0892705714565705.

Thus, it can be considered as object of the present invention to provide a bending method and a bending device, in which the bending of a composite bar can be carried out quickly, simply and in an energy-efficient manner independent from a specific geometry of the composite bar. The bending of the composite bar shall be particularly executable at a construction site of a manufacturer of reinforcements, as well as at the construction location in a quick and cheap manner.

SUMMARY

The object is solved by a bending method as well as a bending device as described herein.

The inventive bending method, as well as the inventive bending device, is configured to bend at least one composite bar at a bending location. The composite bar comprises a reinforcement fiber bundle embedded in a plastic matrix. The reinforcement fibers or filaments of the reinforcement fiber bundle can be plastic fibers and/or natural fibers. Filaments, like glass fibers of different types (e.g. AR-glass fibers), carbon fibers, basalt fibers or a combination thereof can be used. The plastic matrix can comprise a thermoplastic plastic and/or a reversible cross-linked plastic.

At the bending location, at which the composite bar shall be bent, energy is introduced in the composite bar by a sonotrode of an ultrasonic device in order to heat the plastic matrix at the bending location and to make the composite bar deformable or bendable at the bending location. In the initial condition the two bar sections of the composite bar that adjoin the bending location extend preferably in a first spatial direction with reference to a coordinate system that is immovable with regard to the sonotrode during the bending. First the sonotrode is brought into contact with the composite bar at the bending location and the plastic matrix is heated by coupling ultrasonic waves in the composite bar. After the heating an infeed movement between the sonotrode and the composite bar occurs in a second spatial direction that is orientated radial to the bend to be created at the bending location. For execution of the infeed movement, e.g. only the sonotrode may be moved. Preferably the infeed movement occurs exclusively by a linear movement in the second spatial direction. The infeed movement can alternatively be executed by a movement of the composite bar or by a movement of the sonotrode as well as the composite bar.

Due to the infeed movement, the sonotrode deforms the composite bar at the bending location and forms a deformed section at the composite bar. In doing so, particularly a fillet or groove-shaped depression is formed in the deformed section of the composite bar.

The composite bar is bent at least about one axis at the bending location, wherein the axis extends parallel to a third spatial direction that is orientated orthogonal to the second spatial direction. After bending, the plastic matrix is cured at the bending location.

Due to the ultrasonic device with the sonotrode, the energy for heating the composite bar is selectively introduced locally at the bending location into the composite bar. Heating of the whole composite bar is avoided. The ultrasonic heating can be applied to an arbitrary material of the plastic matrix or the reinforcement fiber bundle. Due to the sonotrode, sufficient heat can be created at the bending location within sufficiently short time in order to be able to bend the composite bar. The method is uncritical with regard to occupational safety. In addition, it can be executed with comparable simple means. It can be applied in a manufacturing building as well as at the location of a construction site.

It is preferred, if the orientation of the bar sections of the composite bar adjoining the bending location remains unchanged during the deformation for creation of the deformed section. Particularly the bar sections of the composite bar adjoining the bending location extend along a common straight line prior to the bending and this orientation remains until the bending of the composite bar.

By creation of the deformed section prior to the bending, the section of the reinforcement fiber bundle is tensioned along the bending location and is brought in a desired position. In doing so, the tensile strength of the bent composite bar can be maintained.

After the deformation the composite bar has preferably a width in the third spatial direction in the deformed section that is larger than the dimension in the third spatial direction of the bar sections adjoining the bending location. Thereby the deformed section of the composite bar can have a thickness in the second spatial direction that is smaller than the dimension in the second spatial direction of the bar sections adjoining the bending location. Thus, the deformed section can be more flat in the second spatial direction and can be wider in the third spatial direction than the bar sections adjoining the deformed section. The deformed section forms a fillet or a groove that extends in the third spatial direction.

After bending the composite bar has a bend inner side with an inner curvature and a bend outer side with an outer curvature at the bending location. The bend inner side and the bend outer side are arranged at opposite sides of the composite bar radial with regard to the curvature. The bend inner side is preferably facing the sonotrode. In an arbitrary considered radial plane of the bend the inner curvature has a respective larger amount than the outer curvature in the same radial plane. In each considered radial plane the reinforcement fibers of the reinforcement fiber bundle have a curvature that is preferably smaller or at most as large as the inner curvature in the radial plane.

Instead of a single composite bar, also multiple composite bars can be bent concurrently that are, e.g. part of a mesh body. The mesh body comprises meshes that are formed by multiple composite bars of the mesh body. The plastic matrix of the mesh body or the composite bars can be integrally formed such that a uniform mesh body is present. Alternatively the composite bars can be connected with each other at intersection locations in multiple layers and form the mesh body. At the intersection locations of the mesh body the composite bars can be transitioned integrally into each other or can be fixed being in abutment with each other.

The at least one composite bar or the mesh body can be used as reinforcement for a construction material body.

It is advantageous, if during the infeed movement for forming the deformed section and/or during the bending at least in phases or temporarily ultrasonic waves are emitted from the sonotrode. Due to this measure, an energy loss due to convection from the bar surface can be balanced and the composite bar remains deformable or bendable at the bending location.

Additionally or alternatively, during the bending, at least during phases, energy can be introduced by a further energy source for heating the composite bar at the bending location. This further energy source can be used in addition or as an alternative to the creation of ultrasonic waves during the bending in order to balance heat loss due to convection from the bar surface.

In another embodiment of the method it can be advantageous to omit the emission of ultrasonic waves during the infeed movement for the creation of the deformed section and/or during the bending. In this embodiment the infeed movement and the bending of the bar can be executed sufficiently quick such that during the formation of the deformed section and during the bending a further emission of ultrasonic waves and/or another heating of the bending location for maintenance of the bendability is not necessary. In this embodiment the energy efficiency can be further increased.

If during creation of the deformed section or during the bending, ultrasonic energy is output, the output ultrasonic energy can be feedback controlled depending on a parameter. In doing so, the following parameters can be used:

- The ultrasonic energy output during the infeed movement and/or the bending,
- A time duration during which ultrasonic waves are emitted during the infeed movement and/or during the bending and/or a power of the emitted ultrasonic waves during the infeed movement and/or during the bending,
- A temperature of the composite bar at the deformed section or at the bending location,
- A pressure force between the sonotrode and the composite bar,
- A position of the infeed movement or the sonotrode, particularly the reaching of a predefined end position,
- A bend or angle position of the bar sections adjoining the bending location.

Due to the feedback control of the emitted ultrasonic energy only as much ultrasonic energy is created and output as necessary for the deformation and the bending of the composite bar. In doing so, the energy efficiency can be further improved.

It is also advantageous, if the infeed movement is feedback controlled during the creation of the deformed section depending on at least one of the following control parameters:

- A relative position between the sonotrode and the composite bar,
- A velocity of the infeed movement,
- An acceleration of the infeed movement.

In one embodiment the bending of the composite bar is carried out about a curved sonotrode surface of the sonotrode. The sonotrode surface is curved about at least one axis that extends parallel to the third spatial direction. In addition, the sonotrode surface can also be curved about at least one further axis that extends in the first spatial direction. The shape of the sonotrode surface defines the inner curvature of the composite bar at the bending location. Therefore, the sonotrode serves concurrently as tool part during bending of the composite bar.

In one embodiment of the method the sonotrode can remain stationary during bending. As an alternative, the sonotrode can also be moved during bending, particularly in the second spatial direction and particularly in the direction toward the bending outer side.

In an advantageous embodiment a cooling medium can be supplied to the bending location for curing the composite bar. For example, a gaseous medium and/or a liquid medium can be used as cooling medium. For example, air or another gas can flow to the bending location and/or a spray from a cooling liquid, particularly water, can be created and directed onto the bending location for cooling purposes. Alternatively or additionally, also the sonotrode and/or a support device for supporting the composite bar at the side opposite the sonotrode can be cooled.

If a reversible cross-linked plastic is used as plastic matrix, it preferably comprises multiple components, at least one of which is polymer. The cross-link between the molecular or polymer chains can be separated due to supply of energy, particularly thermal energy. Separation of the cross-link means that the cross-links of the molecular chains at the location at which energy is supplied must not necessarily be separated completely, but up to a sufficient portion due to the energy supply. Accordingly, due to the energy supply at least 25% or at least 50% or at least 70% or at least 90% of the created crosslinks can be separated. The formability in this condition corresponds substantially to that of a thermoplastic material. It is preferred, if the reversible cross-linked plastic is cross-linked at room temperature. The plastic an be self-cross-linking with or without addition of a cross-linking agent. The plastic has preferably a glass transition temperature of at least 50° C. or at least 80° C. or at least 90° C. or at least 100° C. Preferably the glass transition temperature has an amount of at most 130° C. or at most 140° C. or at most 150° C. The reversible cross-linked plastic can be cross-linked by a Diels-Alder-Reaction and can be separated by a Retro-Diels-Alder-Reaction.

The plastic can comprise a first component with at least two dienophilic double bonds and a second component with at least two diene functionalities. The first component and/or the second component can comprise more than two functionalities.

Preferably, the first component and/or the second component is a polymer, for example a polyacrylate, a polymethacrylate, a polystyrene, a copolymer of one or more of the previously mentioned polymers, a polyacrylonitrile, a polyether, a polyester, a polyamide, a polyester amide, a polyurethane, a polycarbonate, an amorphous and semicrystalline poly-□-olefin, an ethylene propylene diene monomer rubber (EPDM), an ethylene propylene rubber (EPM), a polybutadiene, acrylonitrile-butadiene-styrene (ABS) [rubber], styrene-butadiene rubber (SBR), a polysiloxane, and/or a block and/or comb and/or star copolymer of one or more of these polymers.

The first component can be a dienophilic component with two dienophile groups, or an isocyanate or amine with at least two functional groups per molecule. It can be an amine, a diamine, a component with a carbon-sulfur double bond and an electron-acceptor group, a trifunctional dithioester linker, a difunctional polymer from a polymerization (ATRP), an isocyanurate, and preferably an isocyanate. It is further preferable if the isocyanate is a diisocyanate, such as, for instance a 2,2,4-trimethyl-1,6-hexamethylene diisocyanate (TMDI) and/or a 3-isocyanatomethyl-3,5,5-trimethylcyclohexyl isocyanate (isophorone diisocyanate, IPDI).

The second component with at least two diene functionalities can be a diene with alcohol or amine functionality, such as, for instance polyhydric alcohols and/or polyfunctional polyamines. In particular, it can be sorbic alcohol and/or sorbic acid. Preferably, the dienophile is a dithioester. It is also possible for the second component to be a polymer that has been obtained by polymerization (ATRP) and functionalized with conjugated diene groups, such as cyclopentadienyl-terminated poly-(methyl methacrylate) (PMMA-Cp2).

Examples of various plastics that can be used as a plastic matrix are also indicated in DE 10 2010 001 987 A1.

As initially explained, the plastic matrix can also comprise one or more thermal plastic plastic materials alternatively or additionally to the reversibly cross-linked plastic materials.

The bending device comprises a support device for supporting the composite bar at the side opposite of the sonotrode. Preferably, at least one bending tool is present in order to execute the bending movement for bending the composite bar at the bending location.

The support device can comprise at least one stationary support body and/or multiple support bodies that can be moved or positioned relative to each other. Each support body can have a planar support surface that is assigned to the sonotrode or the composite bar and at which the composite bar is in contact during bending.

The support surface can comprise at least one concave curved support surface section in the case of a stationary support body.

The support device and particularly the support surface of the at least one support body is configured to reflect the ultrasonic waves at least partly. The ultrasonic waves that pass through the composite bar are reflected at the side opposite the sonotrode at least partly and preferably completely as far as possible back into the composite bar. In doing so, standing waves can be created. The reflection results in a quicker creation of the bendability at the bending location. The support surface or the at least one support body consists, e.g. of a material with high echogenicity, e.g. of metal.

It is preferred, if the support surface of the at least one support body is configured such that the composite bar is preferably substantially completely in abutment at the support surface after the formation of the deformed section at the bending location during the bending process. In this case, the at least one support surface comprises a curvature that corresponds to the curvature of the at least one composite bar after the formation of the deformed section.

BRIEF DESCRIPTION OF THE DRAWINGS

Preferred embodiments of the invention can be derived from the dependent claims, the description and the drawings. In the following preferred embodiments of the invention are explained with reference to the attached drawings. They show:

DETAILED DESCRIPTION

Figure 1:
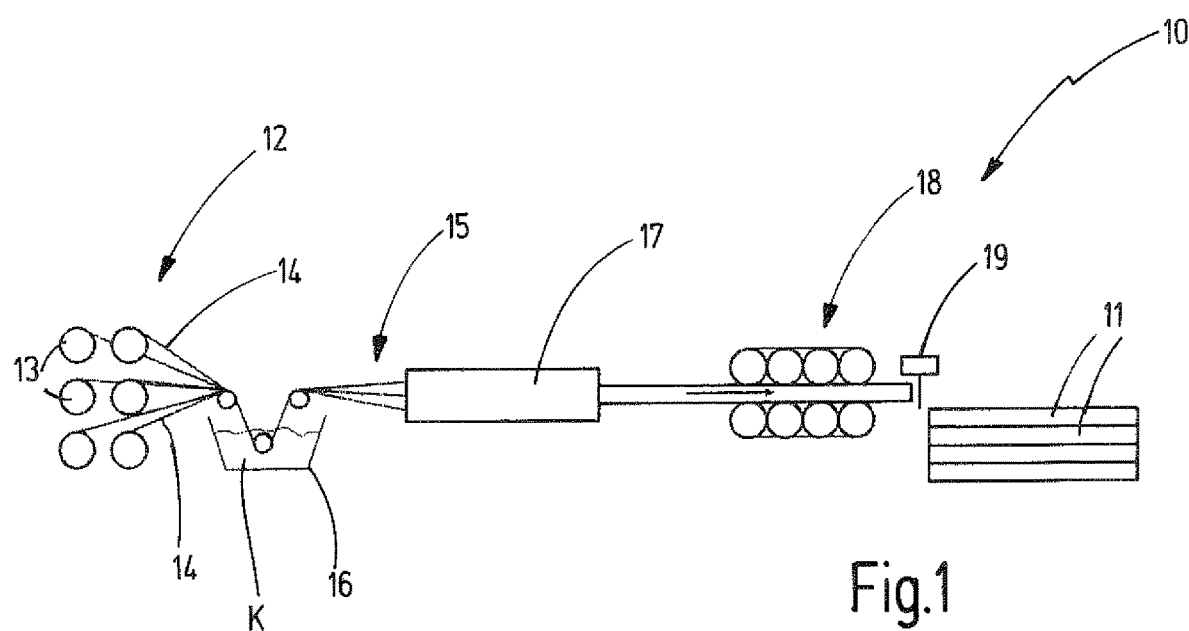
FIG. 1 a basic illustration of an embodiment of a device and a method for manufacturing a composite bar, FIG. 2 a composite bar in a schematic sectional perspective illustration, FIGS. 3-5 a schematic block-diagram-like embodiment of a bending method and a bending device in different phases during bending of a composite bar respectively, FIGS. 6-8 a schematic block-diagram-like illustration of a further embodiment of a bending method or a bending device in different phases during bending of a composite bar, FIG. 9 a modified embodiment of the bending device of FIGS. 6-8 in schematic block-diagram-like illustration, FIGS. 10-12 a schematic block-diagram-like illustration of a further embodiment of a bending method or a bending device in different situations during bending of a composite bar, FIGS. 13-15 an illustration of an embodiment of an ultrasonic device with a sonotrode in different views, FIG. 16 a schematic basic illustration of the deformation of a composite bar for formation of a deformed section, FIG. 17 the composite bar of FIG. 16 in a schematic basic illustration after it has been bent at a bending location, FIG. 18 a cross-section through the deformed section of a composite bar of FIG. 16 according to the sectional line A-A in FIG. 16, FIG. 19 a cross-section through the bending location of the composite bar of FIG. 17 according to the sectional line B-B in FIG. 17, FIG. 20 a schematic basic illustration of a construction material body in perspective partly cut illustration and FIGS. 21-23 a schematic illustration of different exemplary shapes of constructional bodies in a top view respectively.

FIG. 1 shows the principle configuration of a pultrusion device 10 for manufacturing of a composite bar 11. The pultrusion device 10 comprises a creel 12 with multiple bobbins 13. On each of the bobbins 13 a reinforcement thread or a reinforcement fiber 14 is wound. The number of reinforcement fibers 14 and thus the number of bobbins 13 can vary. The reinforcement fibers 14 commonly form a reinforcement fiber bundle 15. The reinforcement fibers 14 are unwound from the bobbins 13 and immersed in a bath 16 of at least one liquid plastic K. The at least one plastic K sticks to the outer surface of the reinforcement fibers 14 and/or saturates the reinforcement fibers 14.

Subsequently, under formation of the reinforcement fiber bundle 15 the reinforcement fibers 14 are guided into a die 17 and are cured in the desired cross-sectional contour, particularly completely cured. During the complete curing a tensile force that is applied on the reinforcement fiber bundle 15 is also maintained in the cured condition. By means of a haul-off device 18 that can comprise driven rollers or drums, the cured bar material is supplied out of the die 17 and is separated by the separation tool 19 in desired lengths. The cut bar material forms the reinforcement bars 11.

Figure 2:
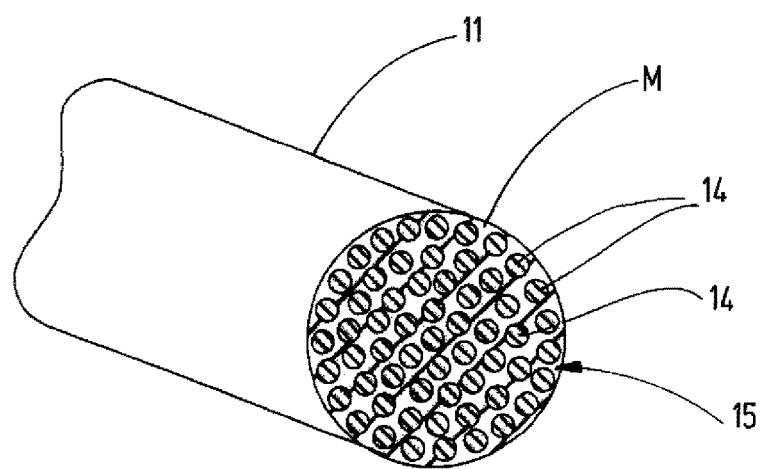

In the embodiment the reinforcement bars 11 have a circular cross-section (FIG. 2). It has to be noted that in modification thereof other arbitrary cross-sectional contours can be manufactured in the die 17.

The at least one plastic K forms a plastic matrix M, in which the reinforcement fibers 14 or the reinforcement fiber bundle 15 is embedded (FIG. 2). The at least one plastic K can be a thermoplastic plastic and/or a reversibly cross-linked plastic.

Figure 3:
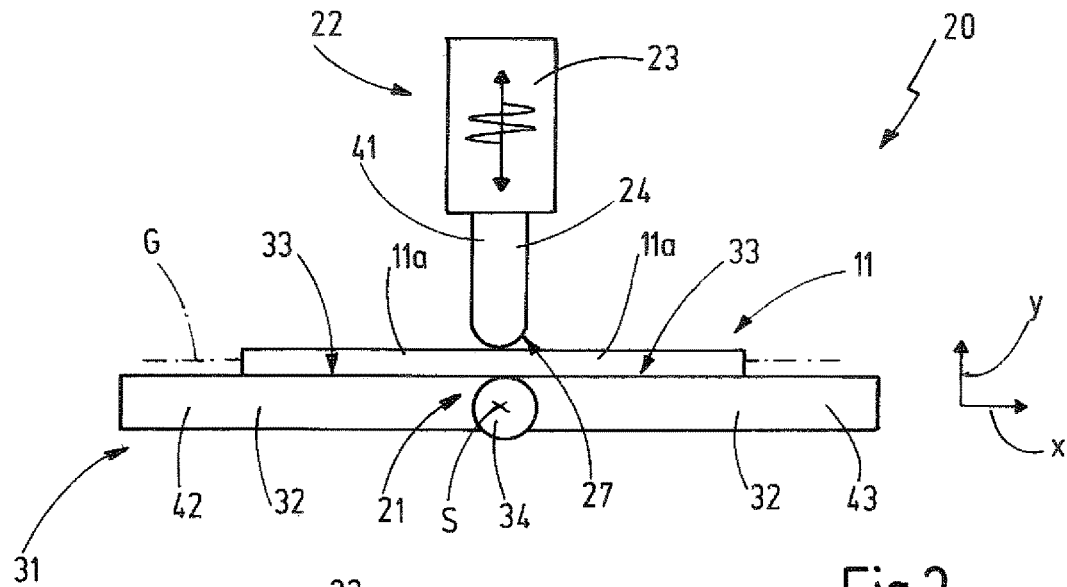
Figure 4:
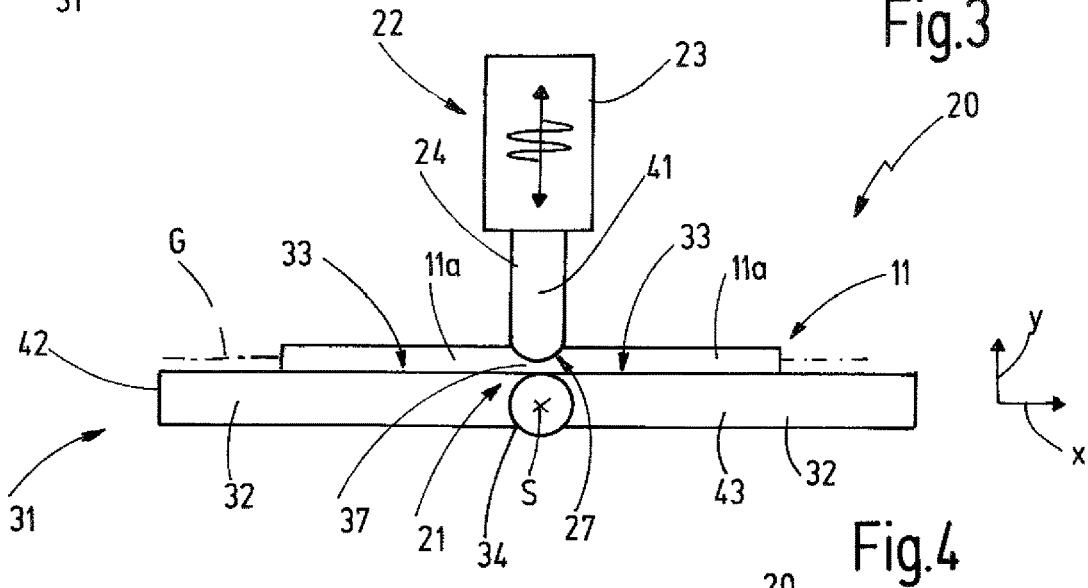
Figure 5:
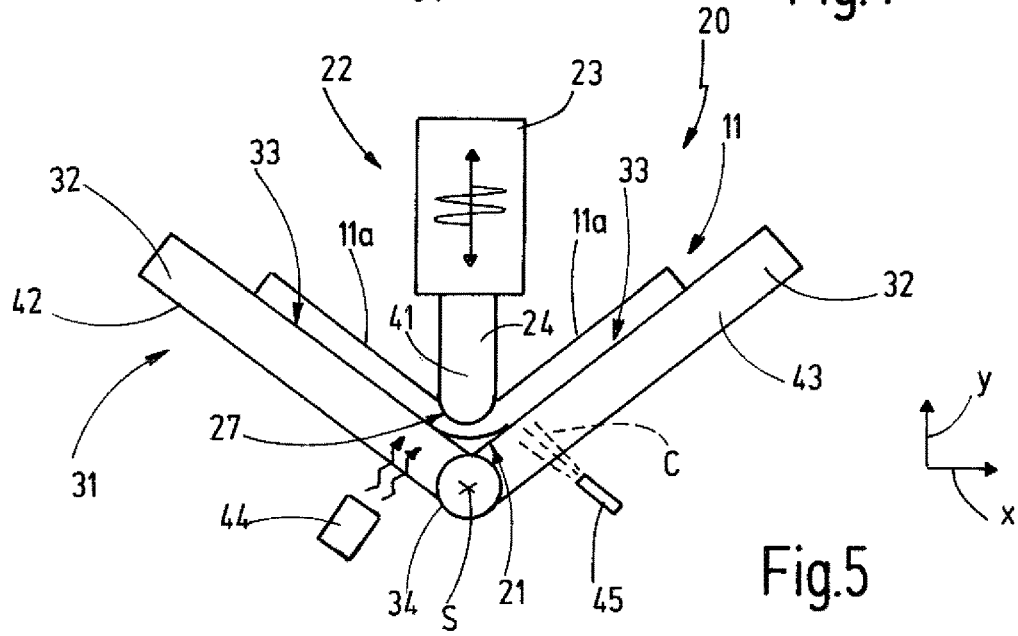

A first embodiment of a bending device 20 is illustrated in FIGS. 3-5. The bending device 20 is configured to bend the composite bar 11 at a bending location 21. Prior to the bending at least the two bar sections 11a that are arranged at opposite sides of the bending location 21 extend along a common straight line G. In the embodiment illustrated here, the composite bar 11 does not have another bending location such that it completely extends along the common straight line G. The straight line G is orientated parallel to a first spatial direction x.

The bending device 20 comprises an ultrasonic device 22 with an ultrasound source 23 as well as a sonotrode 24. The ultrasound source 23 creates ultrasonic waves that can be coupled into the composite bar 11 at the bending location 21 by means of a sonotrode 24 and that locally heat the composite bar 11 at the bending location 21.

An embodiment of the ultrasonic device 22 is illustrated in FIGS. 13-15. The sonotrode 24 extends in a third spatial direction z that is orientated orthogonal to the first spatial direction x from a first end 25 to an opposite second end 26. At one of the two ends 25, 26 and, for example, at the first end 25 the sonotrode 24 is connected with the ultrasound source 23. The ultrasonic device 22 has thus a substantially L-shaped form. The ultrasound source 23 is only highly simplified illustrated in the drawing by the surrounding housing part that is connected with the sonotrode at the first end 25. Originating from the first end 25 the housing of the ultrasound source 23 substantially extends in a second spatial direction y away from the sonotrode 24. The second spatial direction y is orientated orthogonal to the first and the third direction x, z.

The sonotrode 24 has a sonotrode surface 27. According to the example, the sonotrode surface is located at the outside in a front region of the sonotrode 24 that forms an end region of the sonotrode 24 with view in the second spatial direction y. The sonotrode surface 24 is curved about at least one axis, wherein this at least one axis extends parallel to the third spatial direction z. The curvature of the sonotrode surface 27 can be constant such that a constant radius of curvature is formed. The curvature can also comprise varying radii or amounts of curvature.

In addition to this curvature about the at least one axis extending in the third spatial direction z, the sonotrode surface 27 can comprise a further curvature that is illustrated in dashed lines in FIG. 13. Due to this additional curvature, the sonotrode surface 27 can also curve about at least one axis that is orientated parallel to the first spatial direction x. In doing so, spherical or aspherical sonotrode surfaces 27 with curvature extensions in two spatial directions can be provided.

As it can be revealed, particularly from FIGS. 13 and 15, the sonotrode 24 has a section adjoining the second end 26, in which the composite bar 11 can be bent without the bending being hindered by the geometry or the three-dimensional shape of the bent composite bar 11 or by the ultrasound source 23. In FIG. 13 a multiple bent composite bar 11 is illustrated by a dashed dotted line only as an example and in a schematic manner. If multiple bends are created at one composite bar 11 subsequently at different bending locations 21, a bend section of the composite bar 11 can extend over the sonotrode 24 at the side opposite of the sonotrode surface 27. In doing so, multiple bend three-dimensional shapes or extensions of the composite bar 11 can be created without being hindered by the ultrasound source 23.

The embodiment of the ultrasonic device 22 illustrated in FIGS. 13-15 can be used in all of the embodiments of the bending device 20.

A support device 31 is also part of the bending device 20. The support device 31 comprises at least one support body 32, wherein each support body 32 comprises a support surface 33. The support surface 33 is located at the side of the support device 31 facing the ultrasonic device 22 and is respectively configured to support at least a section of the composite bar 11.

The support surface 33 of the at least one support body 32 is configured to at least partly reflect the ultrasonic waves. The ultrasonic waves passing through the composite bar 11 are as far as possible completely reflected back into the composite bar 11 at the side opposite the sonotrode 24. In doing so, according to the example, standing ultrasonic waves are formed between the sonotrode 24 and the support surface 33. The reflection results in a quicker provision of the bendability at the bending location 21. The support surface 33 or the at least one support body 32 consists, e.g. of a reverberant material that reflects a high proportion of the ultrasonic waves at the boundary layer toward the composite bar 11.

By means of a axis arrangement that is not illustrated in detail, an infeed movement in the second spatial direction y can be carried out between the sonotrode 24 and the support device 31. In the embodiment this movement is created by a linear movement of the sonotrode 24 and according to the example the ultrasonic device 22. Additionally or alternatively, also the support device 31 could be linearly moveable in the second spatial direction y. In the embodiment described here such a linear movement of the support device 31 in the second spatial direction y is not provided.

In the embodiment of the bending device 20 illustrated in FIGS. 3-5 at least some or all present support bodies 32 of the support device 31 are moveable relative to each other and according to the example, two support bodies 32 are pivotably arranged about an axis extending in the third spatial direction z. These two support bodies 32 can be connected to each other, e.g. via a swivel joint 34. Such a direct connection is, however, not required. The two support bodies 32 could also be separately moveably and/or pivotably arranged each at a device.

The bending device 20 according to FIGS. 3-5 operates as follows:

First, the composite bar 11 is arranged at the support device 31 or the support surfaces 33 of the support bodies 32. Subsequently the sonotrode 24 is brought into contact with the composite bar 11. Thereby the pressure force between the sonotrode 24 and the composite bar 11 can be controlled or feedback controlled. By means of the ultrasound source 23 ultrasonic waves are created and coupled into the composite bar 11 at the bending location 21, at which the sonotrode surface 27 abuts against the composite bar 11, whereby it is locally heated at the bending location 21 (FIG. 3).

Figure 16:
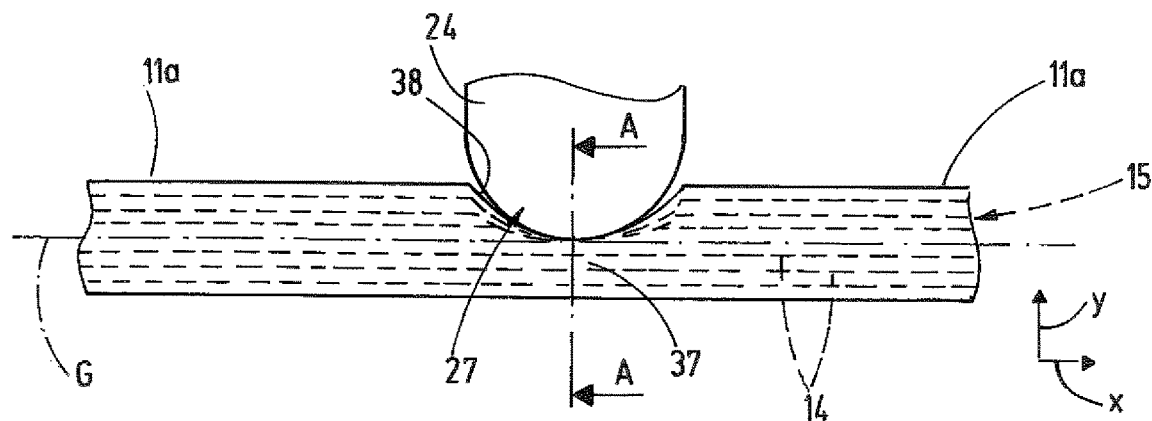

Following and/or concurrently with the injection of the ultrasonic waves an infeed movement of the sonotrode 24 relative to the support device 31 occurs, whereby the sonotrode surface 27 deforms the composite bar 11 at the bending location 21 and thus forms a deformed section 37 at the composite bar 11 (FIG. 4). This situation is also schematically illustrated in FIG. 16. The deformed section 37 obtains a depression 38 in the shape of a fillet or groove due to the pressing of the sonotrode 24 or the sonotrode surface 27. In case of a curved support surface 33, in this method step a curvature is already created at the composite bar 11, wherein the side of the composite bar 11 abutting at the support surface 33 obtains a curvature that corresponds substantially to the curvature of the support surface 33.

Figure 18:
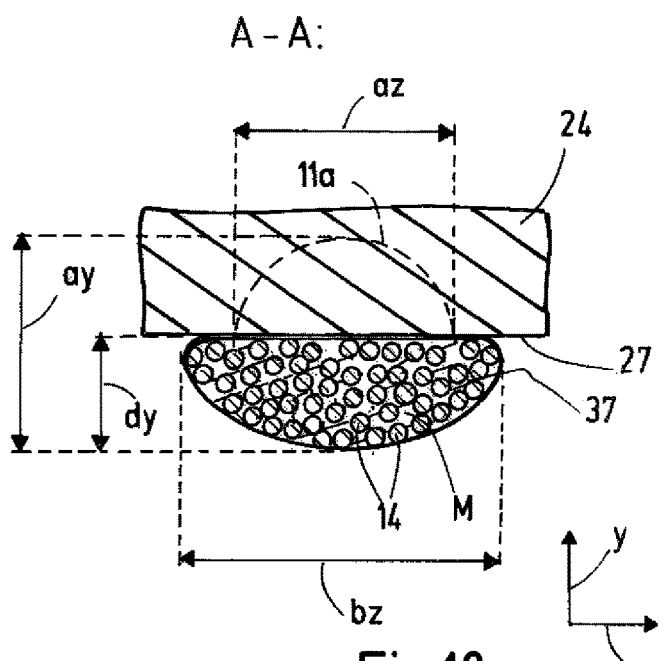

In FIG. 18 a cut through the deformed section 37 is shown and it can be perceived that the deformed section 37 of the composite bar 11 comprises a width bz in the third spatial direction z that is larger than the dimension az in the third spatial direction z of the bar sections 11a adjoining the deformed section 37. Concurrently a thickness dy of the deformed section 37 in the second spatial direction y is smaller than a dimension ay of the bar sections 11a adjoining the deformed section 37. Due to this change of the cross-sectional contour or the dimensions in the deformed section, the reinforcement fibers 14 are displaced from a posterior bend inner side BI of the composite bar 11 toward a posterior bend outer side BA. In doing so, a tension is maintained on the reinforcement fibers 14, if the composite bar 11 is bent during the further process at the bending location 21. The reinforcement fiber bundle 15 remains straight at the bending location 21 in direction of the extension of the composite bar 11 so to speak and does not comprise or does only comprise negligible corrugations or kinks.

The infeed movement for formation of the deformed section 37 at the bending location 21 is schematically illustrated in FIG. 4. The infeed movement can be carried out in a controlled or feedback-controlled manner. During the infeed movement the relative position of the sonotrode 24 relative to the composite bar 11 or the support device 31, the velocity of the infeed movement or the sonotrode 24, the acceleration of the infeed movement or the sonotrode 24 or a combination of these control parameters can be feedback controlled. During the execution of the infeed movement the emission of ultrasonic waves by the ultrasonic device 22 can be omitted. It can also be advantageous to emit at least temporarily or during phases ultrasonic waves in order to maintain the deformability of the composite bar 11 at the bending location 21, because the composite bar cools down due to convection from the bar outer surface.

The bending device 20 comprises at least one bending tool that is configured for bending the composite bar 11 at the bending location. In the embodiment according to FIGS. 3-5 three bending tools are present: A first bending tool 41 is formed by the sonotrode 24 or the sonotrode surface 27 and a second bending tool 42 and a third bending tool 43 are respectively formed by one of the two support bodies 32. For bending the composite bar 11 at the bending location 21 the two support bodies 32 forming the second and the third bending tool 42 and 43 are inclined or pivoted relative to each other, whereby the two bar sections 11*a* abutting against the support surfaces 33 are angled relative to each other (FIG. 5). The first support tool 41 formed by the sonotrode 24 supports the composite bar at the bend inner side at the bending location 21. The inner curvature of the bend inner side is defined by the sonotrode surface 27.

During bending energy can be supplied to the composite bar 11 at the bending location 21 in order to maintain the bendability, if the bar cools down, e.g. due to convection, radiation or thermal conduction. For this the ultrasonic device 22 can at least temporarily or during phases emit ultrasonic waves and couple ultrasonic waves into the composite bar 11. Preferably a support surface 33, at which the composite bar 11 is supported at the bending location 21 is formed in a concave manner, particularly formed in such a concave manner that the curvature corresponds to the outer radius of curvature of the deformed or bent composite bar 11. In doing so the optional noise coupling is as efficient as possible. Alternatively or additionally, a separate energy source 44 can be provided that supplies heat to the composite bar 11 and the bending location 21 in order to maintain a temperature at the bending location 21 that guarantees a bendability of the composite bar 11. For example, the additional energy source 44 can be a thermal radiation source, like an infrared radiator.

Following the bending of the composite bar, the composite bar 11 is again cured at the bending location 21. According to the example, this is carried out by cooling of the plastic matrix M at the bending location 21. The cooling can be accelerated, if a cooling medium C is supplied to the composite bar 11 at the bending location 21. According to the example, the bending device 20 comprises a cooling device 45 by means of which the cooling medium C can be dispensed on the composite bar 11 at the bending location 21. The cooling device 45 can, for example, create and dispense an atomized spray or a gas or air flow as cooling medium C.

Alternatively or additionally, at least one component of the bending device can be cooled, e.g. the sonotrode 24 and/or the support device 31 and/or at least one of the support bodies 32 and/or at least one bending tool 41, 42, 43. For example, cooling media channels can extend through a cooled or coolable component, through which a cooling media can flow during cooling. The time duration for cooling can thus be decreased.

The additional energy source 44 and the cooling device 45 are optional.

In the embodiment shown in the FIGS. 3-5 the support surfaces 33 of the support bodies 32 have a length in extension direction of the bar sections 11*a* such that the respectively assigned bar section 11*a* is not only supported in a point-like manner at a location, but along a longitudinal area and preferably its total length up to the bending location 21. The support bodies 32 can be configured in a plate-like and/or bar-like shape. The support surface 33 can be formed by the inner surface of a groove or flume, in which the respectively assigned bar section 11*a* is located. For example, each bar section 11*a* can abut at the groove flanks of a groove of the support surface 33 and can thus be moved in a guided manner along the groove extension during bending.

Figure 6:
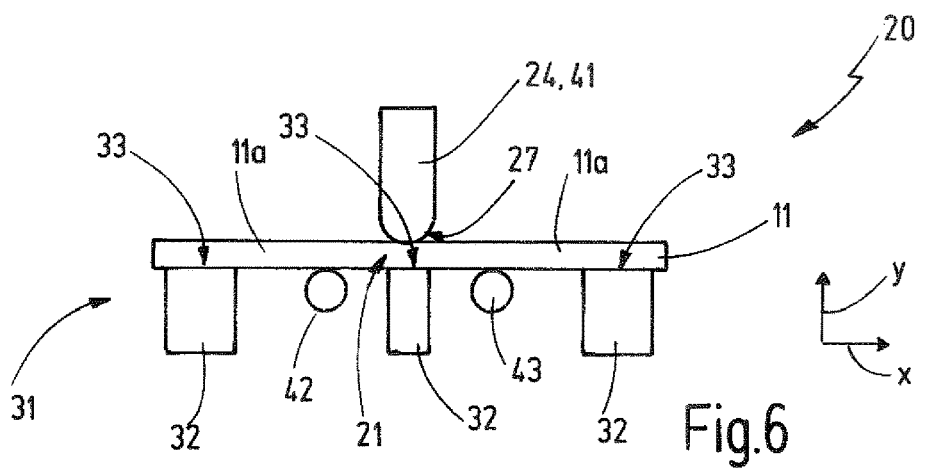
Figure 7:
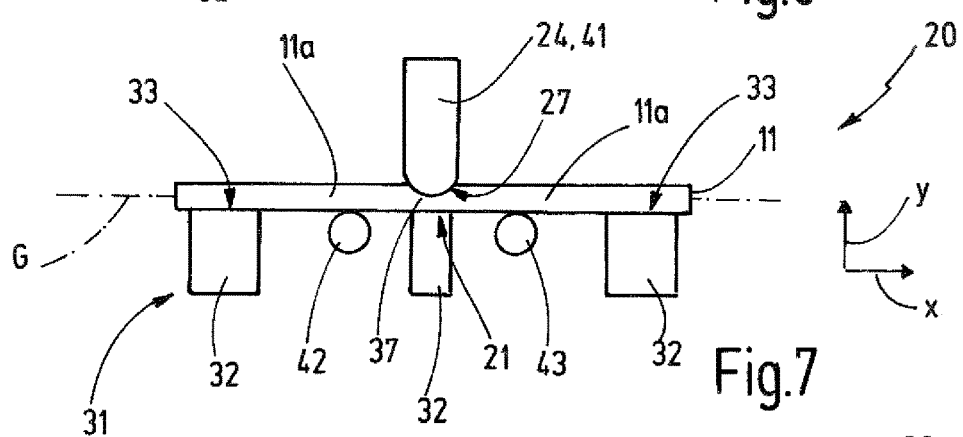
Figure 8:
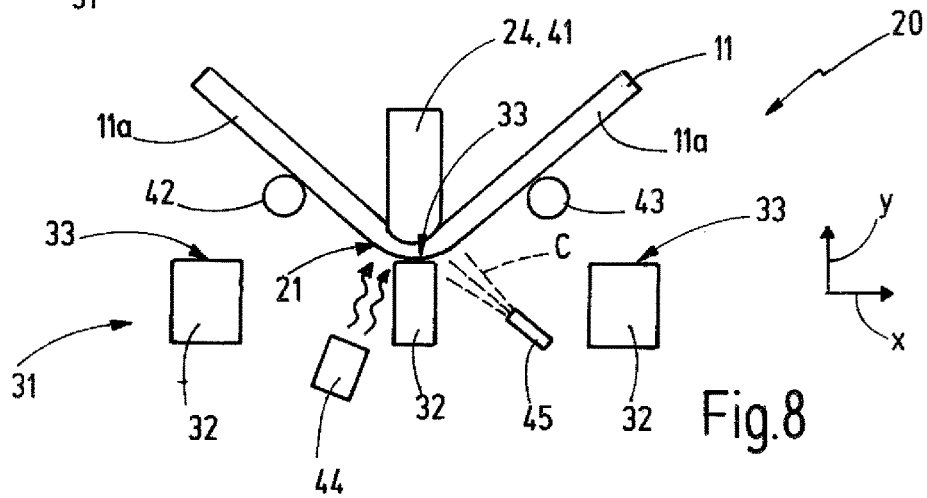

In FIGS. 6-8 a further embodiment of the bending device 20 is illustrated. The configuration substantially corresponds to that of the embodiment according to FIGS. 3-5 such that reference can be made to the description above. The main difference exists in the configuration of the support device 31 as well as the bending tools. The support device 31 comprises multiple and according to the example, three stationary support bodies 32, each having a planar support surface 33. The support surfaces 33 of multiple or all present support bodies 32 can extend in a common plane.

Also in this embodiment the first bending tool 41 is formed by the sonotrode 24. The second and the third bending tool 42, 43 are separately formed from the support device 31 and can be formed by a respective rod or roller. A central support body 32 is arranged in alignment with the sonotrode 24 on the opposite side of the composite bar 11 and supports the composite bar 11 at the bending location 21 against the pressing force of the sonotrode 24. On both sides of the central support body one bending tool 42 or 43 is arranged respectively with view in the first spatial direction x. For bending the bending tools 42, 43 move relative to the first bending tool 41 (sonotrode 24), e.g. in the second spatial direction y or within a plane spanned by the first and the second spatial directions x, y. In doing so, the composite bar 11 is bent about the sonotrode surface 27 at the bending location 21.

Apart therefrom the process of the method corresponds to that explained with reference to FIGS. 3-5 such that reference can be made to the description above.

The adjustment of the method parameters during the bending method depend on the dimension of the material of the composite bar 11.

The total duration for heating the bar by ultrasound, the formation of the deformed section 37 and the bending has an amount of about 10-20 seconds (in case of a composite bar with about 55% fiber volume percentage and a diameter of 8 mm). The infeed of the sonotrode can have an amount of 1 mm/sec.

The emission of ultrasonic waves is started in one embodiment, if a trigger threshold is reached with which the sonotrode presses against the composite bar 11. The trigger threshold can have an amount of, e.g. 50 Newton. The pressure with which the sonotrode 24 is pressed against the composite bar 11 can be limited to a maximum value, e.g. to a value of 400 Newton.

In one embodiment the emission of ultrasonic waves is stopped, if a total energy amount of ultrasonic energy has been output in total, e.g. 2600 Joule (in case of a composite bar with about 55% fiber volume percentage and a diameter of 8 mm).

The present bending tools 41, 42, 43 apply a predefined force on the composite bar 11. As far as the bendability at the bending location 21 is sufficient, the bending of the composite bar 11 at the bending location 21 thus starts.

According to the example, the cooling of the bar is started as soon as the threshold for the total amount of energy is reached. Without supplying a separate cooling medium C, the cooling duration, until the composite bar 11 is bend-resistant again at the bending location 21, can be about 20 seconds (in case of a composite bar with about 55% fiber volume percentage and a diameter of 8 mm). This duration can be shortened by supplying a cooling medium C inside or outside a component of the bending device 20.

The process parameters are adjusted depending on the configuration of the bending device 20, the plastic of the composite bar 11 (amorphous/semi-crystalline, damping factor or mechanical loss factor, softening temperature, melting temperature, glass transition temperature, etc.), the type of the used fibers, the percentage of the fibers from the volume or the mass of the composite bar, the diameter of the composite bar, etc.

Figure 9:
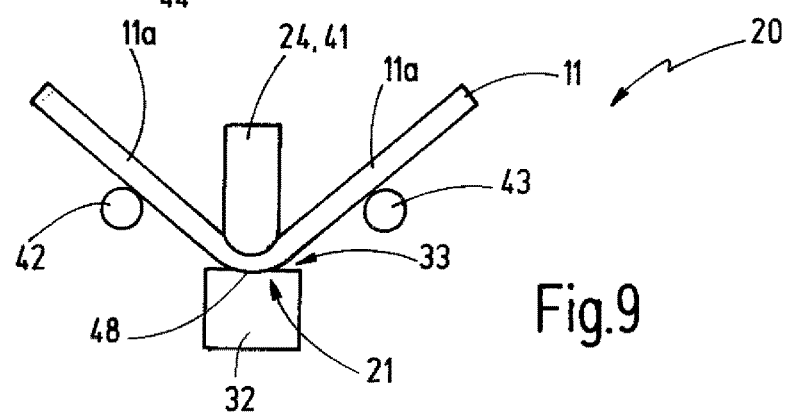

FIG. 9 illustrates schematically a modification of the embodiment of the bending device 20 of FIGS. 6-8. There the central support body 32 has no completely planar support surface 33, but the support surface 33 comprises a concave support cavity 48. The curvature of the concave support cavity 48 corresponds substantially to the outer curvature that the composite bar 11 has at the bending location 21 after formation of the deformed section 37 or that it should have at the end of the bending. By or after the formation of the deformed section 37 and/or during bending of the composite bar 11, the composite bar 11 engages the support cavity 48 at the bending location 21 and is two-dimensionally supported by the support cavity 48.

Figure 10:
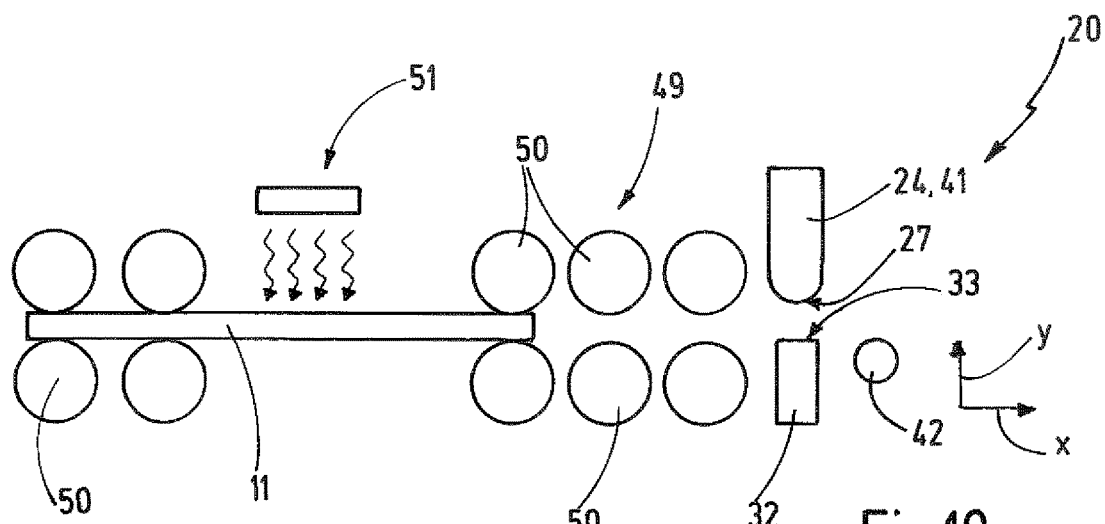
Figure 11:
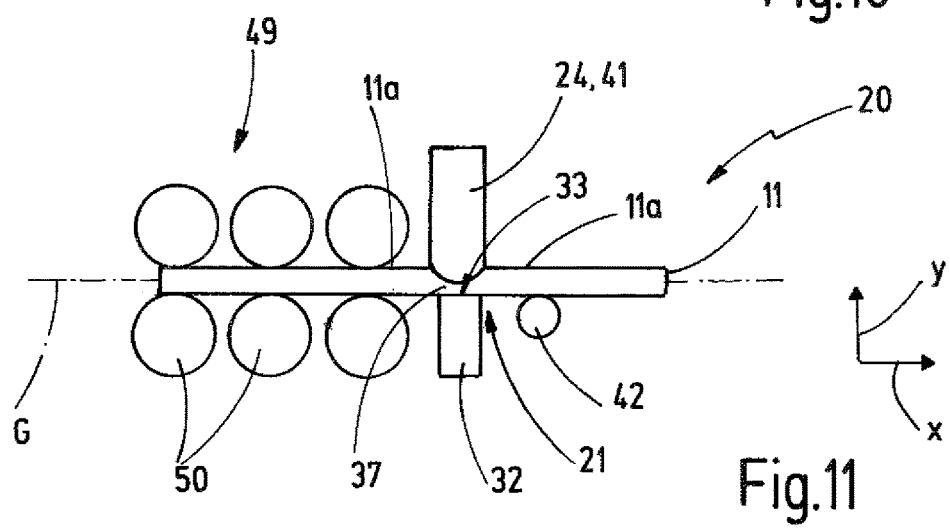
Figure 12:
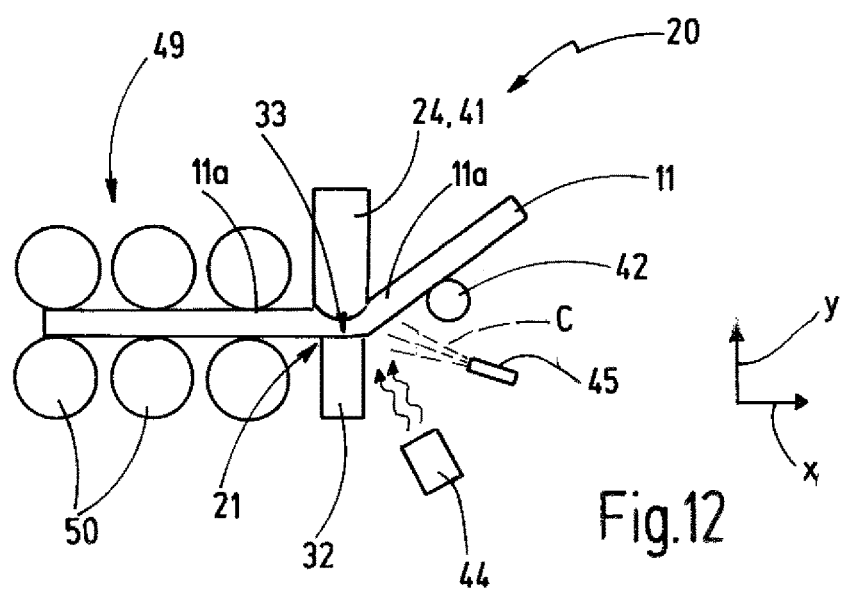

A further embodiment of a bending device 20 is illustrated in FIGS. 10-12. In this embodiment a drum arrangement or roller arrangement 49 with multiple drums or rollers 50 serve for conveying the composite bar 11 in the desired position, such that the bending location 21 is arranged between the sonotrode 24 and a support body 32 of the support device 31. One of the two bar sections 11a remains engaged by the roller arrangement 49, if the deformed section 37 is deformed and the composite bar 11 is bent (FIGS. 11 and 12). In this embodiment the sonotrode 24 in turn forms the first bending tool 41. Different to the other embodiments, only one further bending tool is provided, namely the second bending tool 42 that is moveable relative to the first bending tool 41 in the second spatial direction y or in a plane spanned by the first spatial direction x and the second spatial direction y. The second bending tool 42 is analog to the preceding embodiment according to FIGS. 6-9 formed by a rod or a roller. The roller arrangement 49 is configured for clamping or retaining the composite bar 11 at one of the bar sections 11a, whereas the respective other bar sections 11a is engaged by the second bending tool 42 and is bent about the sonotrode surface 27. Instead of the roller arrangement 49 also another device for clamping of a bar section 11a could be present.

Apart therefrom the bending device 20 as well as the executed method corresponds to the preceding embodiment so that reference can be made to the above explanation.

An optional embodiment with an additional heating device 51 is schematically illustrated in FIG. 10. The additional heating arrangement 51 serves to preheat the composite bar 11 before it is transported in the position, in which it is deformed or bent. Such a heating device 51 can be present in all of the embodiments of the bending device 20. The heating of the composite bar 11 with the heating device 51 can be limited locally to a region that comprises the bending location 21.

The specific embodiments described based on the drawings explain the invention as an example based on the bending of a composite bar 11. For bending of multiple composite bars 11 or a mesh body, the sonotrode surface 27 and/or the at least one support surface 33 and/or other parts of the bending device 20 can be configured with a respective length in the third spatial direction z. This applies for all of the embodiments. The function described based on one composite bar 11 applies accordingly for multiple composite bars 11 or a mesh body.

Figure 17:
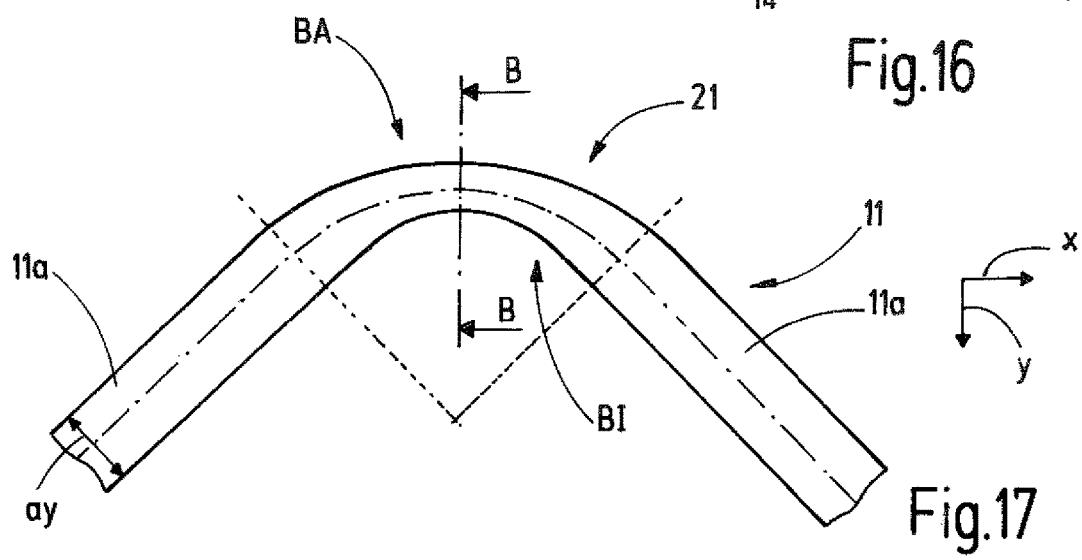
Figure 19:
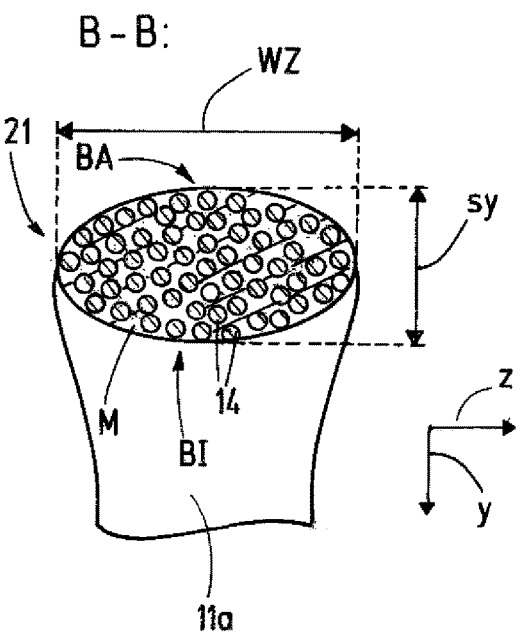
Figure 20:
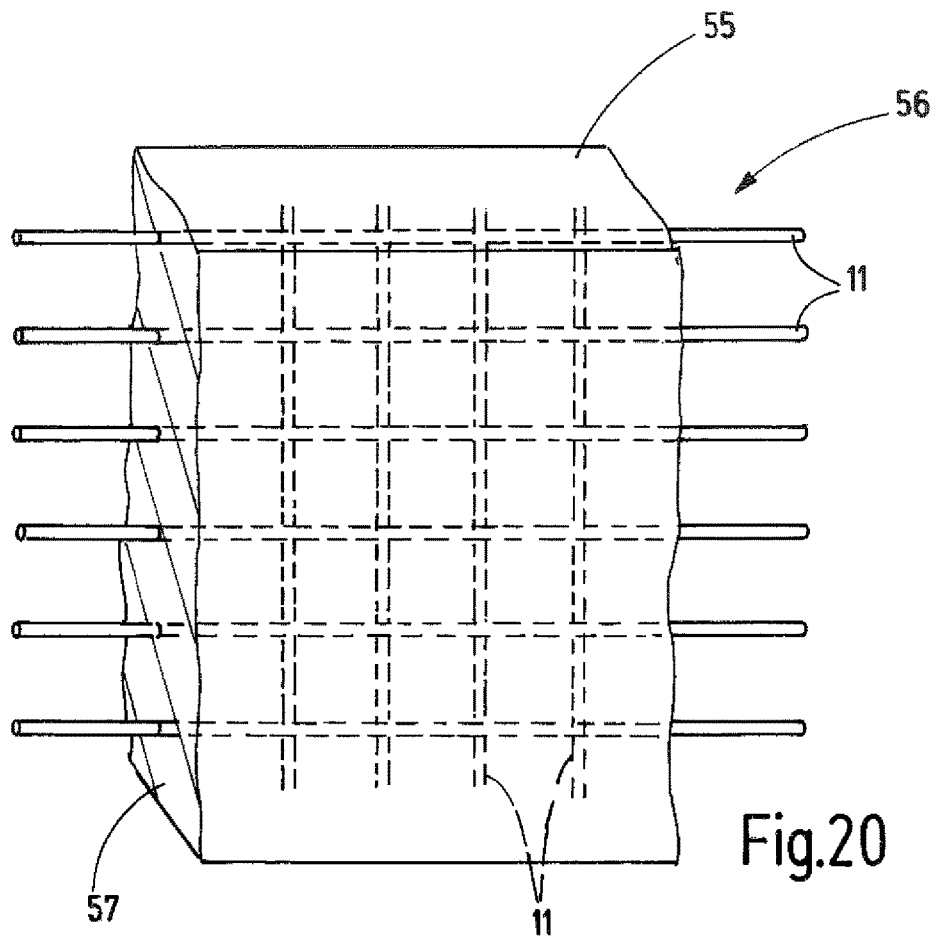
Figure 21:
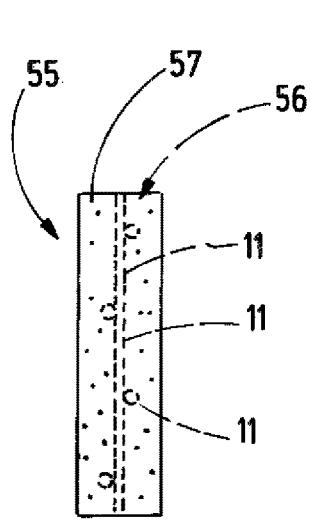

FIGS. 17 and 19 schematically illustrate a bent composite bar 11. At the bending location 21 with view in the second spatial direction y the bend bar has a bend inner side BI having an inner curvature and facing away therefrom an opposite bend outer side BA having an outer curvature. The inner curvature and the outer curvature can have a constant amount or can have varying curvatures or varying radii along the extension of the bend. The bend inner side BI abuts at the sonotrode surface 27 during bending. The inner curvature is thus defined by the extension of the curvature of the sonotrode surface 27. The bend outer side BA abuts preferably at a support surface 33 during bending.

At the bending location 21 the composite bar 11 has a thickness sy with view in the second spatial direction y and a width bz in the third spatial direction z. The width bz is larger than the width or the dimension az of the bar section 11a outside the bending location 21 in the third spatial direction z and is substantially as large as the width bz of the deformed section 37 or slightly smaller. The thickness or dimension sy in the second spatial direction y is smaller at the bending location 21 than the dimension ay of the bar section 11a outside of the bending location 21 and at least as large as the thickness dy of the deformed section 37 in the second spatial direction y. Due to this change in the cross-section, shape of the composite bar 11 at the bending location 21, the reinforcement fibers 14 remain stretched or under tension and do not provide corrugations due to creation of a bend in the region of the bend inner side BI. In doing so, the tensile strength of the composite bar 11 can be maintained.

In all of the embodiments it is possible that ultrasonic waves are coupled into the composite bar 11 at the bending location 21 during the deformation for formation of the deformed section 37 and/or during the bending. In doing so, energy is supplied to the composite bar 11 and the bending location 21 of the composite bar 11 can correspond at least to a required minimum temperature in order to maintain the deformability or the bendability. In doing so, heat losses due to convection can be balanced. It can be provided that the temperature of the composite bar 11 at the bending location 21 is feedback controlled. It is also possible to feedback control a timer duration during which ultrasonic waves are coupled into the composite bar and/or an ultrasonic power of the emitted ultrasonic waves during deformation or bending. Also the total ultrasonic energy that is output during deformation or bending can be controlled or feedback controlled. Finally, also the pressure force between the sonotrode 24 and the composite bar 11 can be controlled or feedback controlled. Also a combination of the above-mentioned controls or feedback controls is possible.

Figure 22:
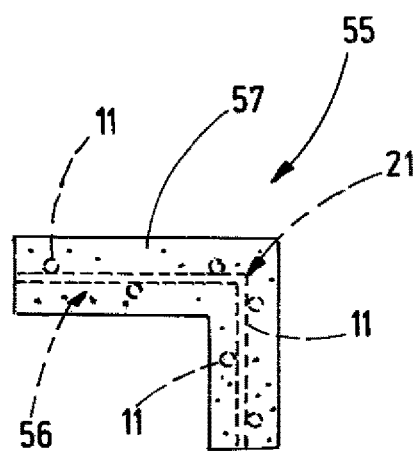
Figure 23:
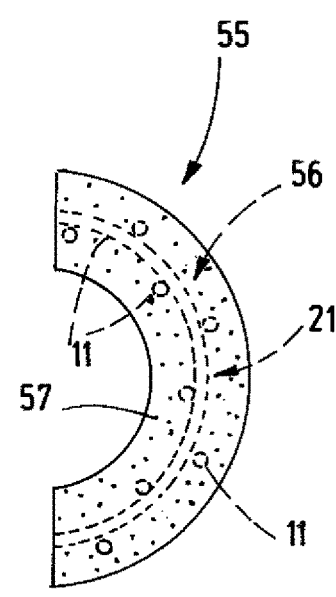

In FIGS. 20-23 a construction material body 55 with a reinforcement arrangement 56 is schematically illustrated respectively. The reinforcement arrangement 56 comprises one or more reinforcement bars 11. They are embedded in a construction material matrix 57 of the construction material body 55. The reinforcement bars 11 can form a mesh or another suitable two-dimensional or three-dimensional reinforcement arrangement 56. As is illustrated in FIGS. 22 and 23 depending on the form of the construction material body 55, it can be necessary or advantageous to bend one or more reinforcement bars 11 at one or more bending locations 21. This can be carried out in a factory building or at the location of the construction site with the bending method described above and the bending device 20 described above. By using the bending device 20 or by using the bending method, construction material body 55, at least one bent composite bar 11 can thus be manufactured.

The invention refers to a bending method and a bending device 20, wherein a composite bar 11 having a reinforcement fiber bundle 15 embedded in a plastic matrix M is bent at a bending location 21. In order to enable the bendability, the composite bar 11 is locally heated at the bending location 21. An ultrasonic device 22 with a sonotrode 24 serves this purpose. After heating the bending location by an infeed movement between the composite bar 11 and the sonotrode 24, a region of the composite bar 11 at the bending location 21 is deformed to a deformed section 37, the outer dimensions of which are different from the outer dimensions of the bar sections 11a of the composite bar 11 that adjoin the bending location 21. Subsequently the two bar sections 11a are moved or angled relative to each other such that the composite bar 11 is curved at the bending location 21. Preferably the composite bar 11 is supported at the sonotrode 24. If the desired bend is reached, the composite bar 11 is cured at the bending location 21.

LIST OF REFERENCE SIGNS 10 pultrusion device
11 composite bar
11a bar section
12 creel
13 bobbin
14 reinforcement fiber
15 reinforcement fiber bundle
16 band
17 die
18 haul-off device
19 separation tool
20 bending device
21 bending location
22 ultrasonic device
23 ultrasound source
24 sonotrode
25 first end of the sonotrode
26 second end of the sonotrode
27 sonotrode surface
31 support device
32 support body
33 support surface
34 swivel joint
37 deformed section
38 depression
41 first bending tool
42 second bending tool
43 third bending tool
44 energy source
45 cooling device
48 support cavity
49 roller arrangement
50 roller
51 heating device
55 construction material body
56 reinforcement arrangement
57 construction material matrix
ay dimension of the bar section in the second spatial direction
az dimension of the bar section in the third spatial direction
bz width of the forming section
C cooling medium
dy thickness of the forming section
K plastic
M plastic matrix
S pivot axis
x first spatial direction
y second spatial direction
z third spatial direction

The invention claimed is:

1. A bending method for bending at least one composite bar (11) at a bending location (21) that comprises a reinforcement fiber bundle (15) with multiple reinforcement fibers (14) embedded in a cured plastic matrix, the method comprising the following steps:
arranging a sonotrode (24) of an ultrasonic device (22) at the bending location (21), wherein two bar sections (11a) of the at least one composite bar (11) that adjoin the bending location (21) extend in a first spatial direction (x),
heating a plastic matrix (M) of the at least one composite bar (11) at the bending location (21) by coupling ultrasonic waves in the at least one composite bar (11) at the bending location (21),
prior to bending the at least one composite bar (11), deforming the at least one composite bar (11) for formation of a deformed section (37) at the bending location (21) by an infeed movement between the sonotrode (24) and the at least one composite bar (11) in a second spatial direction (y) that is orientated radial to a bend that is to be created at the bending location (21),
bending the at least one composite bar (11) at the bending location (21),
curing the plastic matrix (M) at the bending location (21).

2. The bending method according to claim 1, wherein an orientation of the bar sections (11a) of the at least one composite bar (11) remain unchanged relative to each other during the formation of the deformed section (37).

3. The bending method according to claim 1, wherein the deformed section (37) of the at least one composite bar (11) comprises a width (bz) in a third spatial direction (z) that is larger than a dimension (az) in the third spatial direction (z) of the bar sections (11a) adjoining the bending location (21), wherein the third spatial direction (z) is orientated orthogonal to the first spatial direction (x) and the second spatial direction (y).

4. The bending method according to claim 1, wherein the deformed section (37) of the at least one composite bar (11) has a thickness (dy) in the second spatial direction (y) that is smaller than a dimension (ay) in the second spatial direction (y) of the bar sections (11a) adjoining the bending location (21).

5. The bending method according to claim 1, wherein the at least one composite bar (11) has at the bending location (21) a bend inner side (BI) with an inner curvature and with reference to a center axis of the at least one composite bar (11) an opposite bend outer side (BA) with an outer curvature, wherein the inner curvature of the at least one composite bar (11) is larger than the outer curvature and wherein none of the reinforcement fibers (14) have a curvature at the bending location (21) that is larger than the inner curvature.

6. The bending method according to claim 1, further comprising emitting ultrasonic waves from the sonotrode (24) at least during phases during the infeed movement for formation of the deformed section (37) and/or during bending.

7. The bending method according to claim 1, further comprising supplying energy by a further energy source (44)

at least during phases to the at least one composite bar (11) at the bending location (21) during bending.

8. The bending method according to claim 1, further comprising feedback controlling at least one of the following control parameters during the formation of the deformed section (37) and/or during bending:
- an ultrasonic energy output during the infeed movement and/or during bending,
- a time duration during which ultrasonic waves are emitted during the infeed movement and/or during bending,
- a power of the emitted ultrasonic waves,
- a temperature of the at least one composite bar (11) at the deformed section (37) or at the bending location (21),
- a pressure force between the sonotrode (24) and the at least one composite bar (11),
- a position of the infeed movement,
- a bend or angle position of the bar sections adjoining the bending location.

9. The bending method according to claim 1 further comprising omitting the emission of ultrasonic waves by the sonotrode (24) during the infeed movement for formation of the deformed section (37) and/or during bending.

10. The bending method according to claim 1, further comprising feedback controlling at least one of the following control parameters of during the formation of the deformed section (37):
- a relative position between the sonotrode (24) and the at least one composite bar (11),
- a velocity of the infeed movement,
- an acceleration of the infeed movement.

11. The bending method according to claim 1, wherein bending is carried out about a curved sonotrode surface (27) of the sonotrode (24), wherein the sonotrode surface (27) is curved about at least one axis that extends parallel to a third spatial direction (z), wherein the third spatial direction (z) is oriented orthogonal to the first spatial direction (x) and the second spatial direction (y).

12. The bending method according to claim 11, wherein the sonotrode surface (27) is in addition curved about at least one axis that extends parallel to the first spatial direction (x).

13. The bending method according to claim 1, further comprising keeping the sonotrode (24) stationary during bending.

14. The bending method according to claim 1, further comprising moving the sonotrode (24) in the second spatial direction (y) during bending.

15. The bending method according to claim 1, further comprising supplying a cooling medium (C) to the bending location (21) for curing the at least one composite bar (11).

16. The bending method according to claim 15, further comprising contacting the at least one composite bar (11) at the bending location (21) with a component within which a cooling medium flows and/or contacting the composite bar (11) directly with the cooling medium (C).

17. The bending method according to claim 1, wherein the plastic matrix (M) of the at least one composite bar (11) comprises a reversibly cross-linked plastic (K).

18. The bending method according to claim 1, wherein the plastic matrix (M) of the at least one composite bar (11) comprises a thermoplastic plastic (K).

* * * * *